Sept. 24, 1968  W. L. WANMAKER ETAL  3,403,279
X-RAY CONVERTER HAVING TERBIUM ACTIVATED
LANTHANUM COMPOUND PHOSPHOR
Filed Sept. 2, 1966
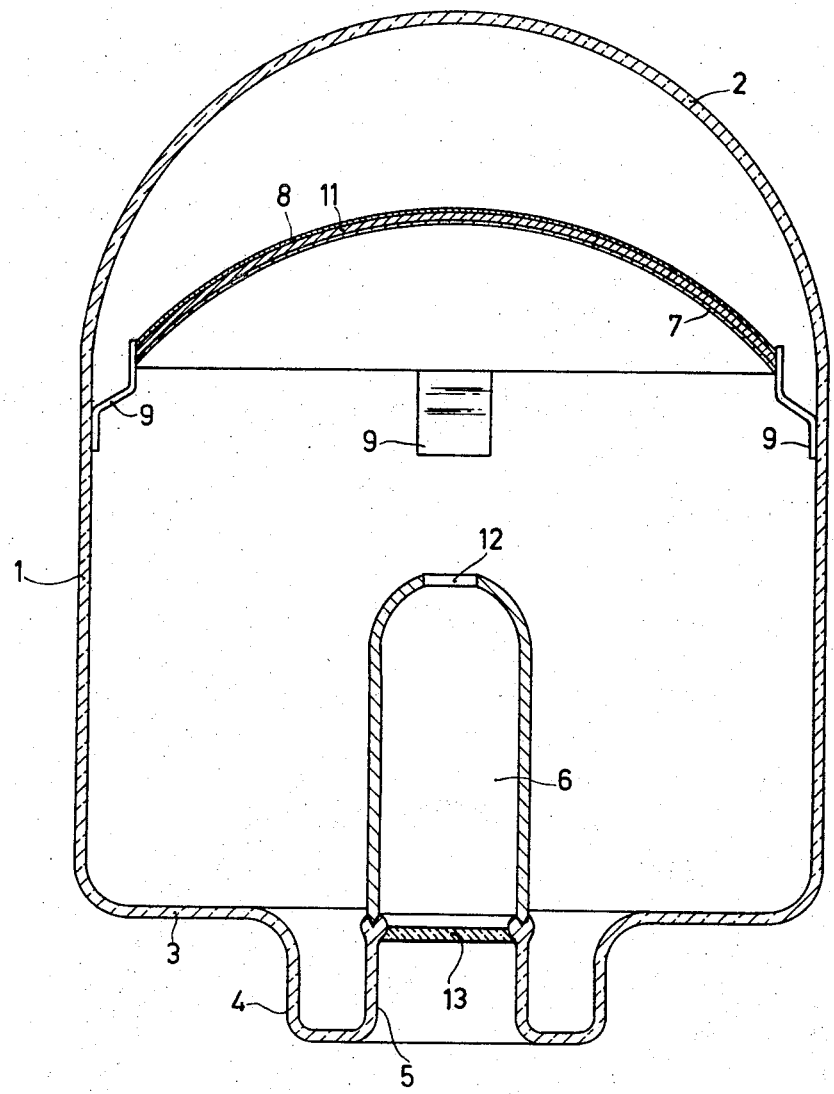
INVENTORS
WILLEM L. WANMAKER
ALFRED BRIL
JOHANNUS G. VERLIJSDONK
BY
AGENT

United States Patent Office 3,403,279
Patented Sept. 24, 1968

3,403,279
X-RAY CONVERTER HAVING TERBIUM ACTIVATED LANTHANUM COMPOUND PHOSPHOR
Willem Lambertus Wanmaker, Alfred Bril, and Johannus Godefridus Verlijsdonk, Emmasingel, Eindhoven, Netherlands, assignors to North American, Philips Company, Inc., New York, N.Y., a corporation of Delaware
Filed Sept. 2, 1966, Ser. No. 576,879
Claims priority, application Netherlands, Sept. 4, 1965, 6511566
3 Claims. (Cl. 313—94)

ABSTRACT OF THE DISCLOSURE

Terbium activated lanthanum oxide, silicate or phosphate phosphor employed in X-ray sensitive screen in image converter.

---

Our invention relates to improvements in image converters and to novel phosphors for use therein.

Image converters of the type comprising an electric discharge tube having a luminescent screen sensitive to X-rays and a photocathode optically coupled to this screen are well known in the art.

Image converters of the aforementioned kind are frequently used to intensify X-ray images formed on the luminescent screen so that they are more suitable for visual observation, or to convert them into electrical signals, for example, for the transmission of television images. Tubes of the first-mentioned kind are generally referred to as X-ray image intensifiers. The use of a photocathode optically coupled with the luminescent screen is common to both kinds of tubes. This photocathode may face directly on the luminescent screen.

In the luminescent screen, the energy of the incident X-rays is converted into rays of greater wave lengths, for example, visible light and an electron current is released from the photocathode by these rays. In the X-ray image intensifier tubes, this electron current is directed by means of an electric field and an electromagnetic field onto a second luminescent screen suitable for visual observation. In a tube for converting the X-ray image into television signals, the electron current from the photocathode is directed onto a collecting screen and is converted there into electric signals. In both kinds of tubes, an intensification may be effected by means of the electric field and/or of the electromagnetic field.

In the image converter the luminescent screen sensitive to X-rays should meet certain requirements. Among these requirements are the necessity of the X-ray sensitive phosphor to have a high specific weight and contain an element of a comparatively high atomic number so that the X-rays are satisfactorily absorbed in the luminescent material. The more satisfactorily the X-radiation is absorbed the thinner the screen need be. A thin screen has the advantage of a high dissolving power.

Other requirements for the X-ray sensitive screen are that the spectral distribution of the emitted radiation corresponds as close as possible to the excitation spectrum of the phosphor photocathode and that the X-rays impinging upon the screen be converted to the emitted radiation as effectively as possible.

A high efficiency of conversion of the incident X-rays is of course required for obtaining a strong electron current from the photocathode.

The emission spectrum of the radiation emitted by the luminescent screen must correspond to the greatest possible extent with the spectrum of excitation of the material of the photocathode, since this results in an optimum efficiency of the conversion into an electron current. The photocathodes used for this purpose are substantially all most sensitive to long-wave ultraviolet radiation and to blue and green light. Consequently, it is desirable for the luminescent material to emit the greatest possible quantity of this radiation upon excitation by the X-rays.

A plurality of luminescent materials for use in electric discharge tubes of the aforementioned kind are already known which fulfill these requirements to a certain extent. One of the substances most frequently used in X-ray image intensifiers is silver-activated zinc-cadmium sulfide. This substance has the disadvantages of having a low specific weight, and in not containing an element having a high atom number so that its absorption of the X-rays is low, but its efficiency of conversion is particularly high and may be up to 20%. Further, its emitted radiation is green. Consequently, this zinc sulfide phosphor proves satisfactory if the energy of the incident radiation is not too high, for example, lower than 40 kv. However, when a higher energy is employed, the absorption becomes too low so that a thicker screen must be used, which gives rise to a blurred image. Another known substance used for the same purpose is calcium tungstenate. This substance has a high specific weight and a satisfactory absorption and it emits blue light but it has a very low efficiency of conversion, i.e. approximately 3%. This substance is preferably used for X-rays of high energy.

A principal object therefore of our invention is to provide an improved phosphor sensitive to X-radiation.

Another principal object of our invention is to provide an image-converter wherein the X-ray sensitive screen is particularly adapted for converting X-radiation to long-wave ultraviolet radiation or to blue or green light.

These and other objects of our invention will be apparent from the description that follows.

According to our invention we have found that terbium activated lanthanum compounds such as the silicates, phosphates and oxides meet the above-mentioned requirements to a remarkably high degree. Thus, according to one aspect of our invention, we employ as an X-ray sensitive phosphor in the X-ray sensitive screen in the image converter a terbium activated lanthanum silicate, phosphate or oxide.

The lanthanum has a comparatively high atom number, i.e. 57. Since also the specific weights of the oxide, the phosphates and the silicates are high, these substances have a high absorption for the incident X-rays and they may be used successfully for X-rays of more than 40 kv. The emission of these substances lies in the green part of the spectrum with a sharp peak at 545 nm. The efficiency of conversion amounts to 3 to 6%.

A particularly advantageous property of the terbium-activated lanthanum phosphors of our invention is that they have a low chemical reactivity. This is of advantage in reducing the risk of chemical interaction for those structures in which the photocathode is in direct contact with the luminescent screen. Moreover, the phosphors of our invention can be obtained in a simple and conventional manner from lanthanum compounds which are commercially available, for example, lanthanum oxide.

The lanthanum oxide, the lanthanum phosphate or the lanthanum silicate preferably contains per mole compounds 0.06 to 0.09 mol of terbium. At this percentage, the optimum efficiency of conversion is attained.

The phosphates and silicates having different ratios of the acid and metal and basic oxides, for example, the ortho-, pyro- or meta compounds may all be employed in our phosphors.

Our invention will now be described with greater particularity with reference to the accompanying drawing, the sole figure of which is a cross-sectional view of an X-ray image intensifier embodying our invention and the following examples.

The image converter represented in the drawing comprises an evacuated envelope 1 of glass or metal closed at one end by a dome-like part 2. At the other end it is closed by a flat wall part 3 with an outwardly extending cylindrical part 4–5. Part 5 is connected to a metal cylinder 6. The electrode system consists of this cylinder 6 which functions as the anode and the metal base 8 of the X-ray screen which is the cathode. The base 8 carries a luminescent screen 11 containing a terbium-activated oxide, phosphate or silicate of lanthanum according to the invention. On the side remote from the base 8 the screen 11 is covered with a photosensitive layer 7 which emits electrons under the influence of the photons emitted by the screen 11, when it is excited by X-rays penetrating through the base 8. The electrons, emitted by the photocathode 7, are focussed into the opening 12 of the anode 6 and finally hit the luminescent observation screen 13. With 9 supporting elements for the screen assembly 8–11–7 are indicated.

Example 1

| | G. |
|---|---|
| $La_2O_3$ | 3.06 |
| $(NH_4)_2HPO_4$ | 2.64 |
| $Tb_4O_7$ | 0.22 | are mixed and the mixture is heated in air at 600° C. for 2 hours. The reaction product is pulverized and heated in air at 1150° C. for 2 hours. The resulting substance is thereupon heated in air at 1150° C. for 2 hours and pulverized and is then ready for use. Upon excitation with radiation with a wavelength of 235.7 nm or with electrons, the substance emits green light. Under electron excitation the efficiency is 3.1%.

Example 2

| | G. |
|---|---|
| $La_2O_3$ | 2.87 |
| $(NH_4)_2HPO_4$ | 2.64 |
| $Tb_4O_7$ | 0.45 | are mixed and the mixture is treated in a corresponding manner as the mixture of Example 1. The resulting substance shows a green emission under excitation with electrons or when excited by a radiation with a wavelength of 253.7 nm. Under electron excitation the efficiency is 4.00%.

Example 3

| | G. |
|---|---|
| $La_2O_3$ | 4.65 |
| $LaF_3$ | 0.67 |
| $SiO_2$ | 2.23 |
| $Tb_4O_7$ | 0.38 | are mixed and the mixture is heated in air at 1200° C. for 2 hours. The reaction product is pulverized and heated in air at 1400° C. for 2 hours. After pulverizing the resulting substance is ready for use. It shows a green luminescent under short wave ultra-violet excitation or electron bombardment. The efficiency in the latter case is 2.1%.

Example 4

| | G. |
|---|---|
| $La_2O_3$ | 3.17 |
| $LaF_3$ | 0.24 |
| $Tb_4O_7$ | 0.40 | are mixed and the mixture is treated in a corresponding manner as the mixture of Example 3, except that the second heating step is carried out at 1300° C. The resulting product luminesces green under short wave ultra-violet or electron excitation. In the latter case the efficiency is 2.6%.

While we have described our invention in connection with specific embodiments and applications, other modifications thereof will be readily apparent to those skilled in this art without departing from the spirit and scope of the invention as defined in the appended claims.

What we claim is:

1. An image converter comprising an electric discharge tube having a luminescent screen responsive to X-radiation and a photocathode optically coupled to said screen, said luminescent screen comprising a phosphor capable of converting X-radiation to radiation of longer wavelength said phosphor being a terbium activated lanthanum compound selected from the group consisting of lanthanum phosphates, lanthanum silicates and lanthanum oxides, said lanthanum compound containing per mole 0.06 to 0.09 mole of terbium.

2. The image converter of claim 1 wherein the phosphor is a terbium activated lanthanum phosphate.

3. The image converter of claim 1 wherein the phosphor is a terbium activated lanthanum silicate.

References Cited

UNITED STATES PATENTS

| 3,330,981 | 7/1967 | Aia | 313—108 X |
| 3,104,226 | 9/1963 | Struck. | |
| 3,322,682 | 5/1967 | Thompson | 252—301.4 |

FOREIGN PATENTS

| 62,272 | 12/1948 | Netherlands. |
| 1,022,399 | 12/1964 | Great Britain. |

ROBERT SEGAL, *Primary Examiner.*